United States Patent [19]

Fineman

[11] 3,920,900

[45] Nov. 18, 1975

[54] TELECOMMUNICATIONS RECEIVERS

[75] Inventor: Laurence Keith Fineman, Bath, England

[73] Assignee: The Post Office, London, England

[22] Filed: Aug. 28, 1974

[21] Appl. No.: 501,244

[30] Foreign Application Priority Data

Sept. 5, 1973 United Kingdom ............... 41750/73

[52] U.S. Cl. ......... 178/69.5 R; 179/15 BS; 325/325; 340/146.1 D

[51] Int. Cl.$^2$ ............................................ H04L 7/00

[58] Field of Search ................... 178/69.5 R, 69.5 F; 179/15 BS; 340/146.1 D; 328/155; 325/325; 235/92 EC, 92 T, 92 CA, 92 PS

[56] References Cited

UNITED STATES PATENTS

| | | | |
|---|---|---|---|
| 3,525,813 | 8/1970 | Taylor et al. | 179/15 BS |
| 3,581,010 | 5/1971 | Kobayashi | 178/69.5 R |
| 3,735,045 | 5/1973 | Clark | 178/69.5 R |
| 3,770,897 | 11/1973 | Haussmann et al. | 179/15 BS |
| 3,854,011 | 12/1974 | Mallory et al. | 178/69.5 R |
| 3,887,769 | 6/1975 | Cichetti, Jr. et al. | 178/69.5 R |

*Primary Examiner*—Malcolm A. Morrison
*Assistant Examiner*—Errol A. Krass
*Attorney, Agent, or Firm*—Kemon, Palmer & Estabrook

[57] ABSTRACT

A method and apparatus are described for reframing a frame-structured telecommunication signal in which detection of a suspected misframe condition initiates a checking process to determine whether a misframe condition exists and at the same time initiates a hunting process to determine the correct frame structure. Checking is effected by accumulating indications of in frame and out of frame conditions in a bidirectional counter and an out of frame decision is made when the counter reaches a limit value. A local frame distributor is then shifted immediately to the new frame structure found by the hunting process. Reframing is thereby accomplished with minimal information loss.

7 Claims, 1 Drawing Figure

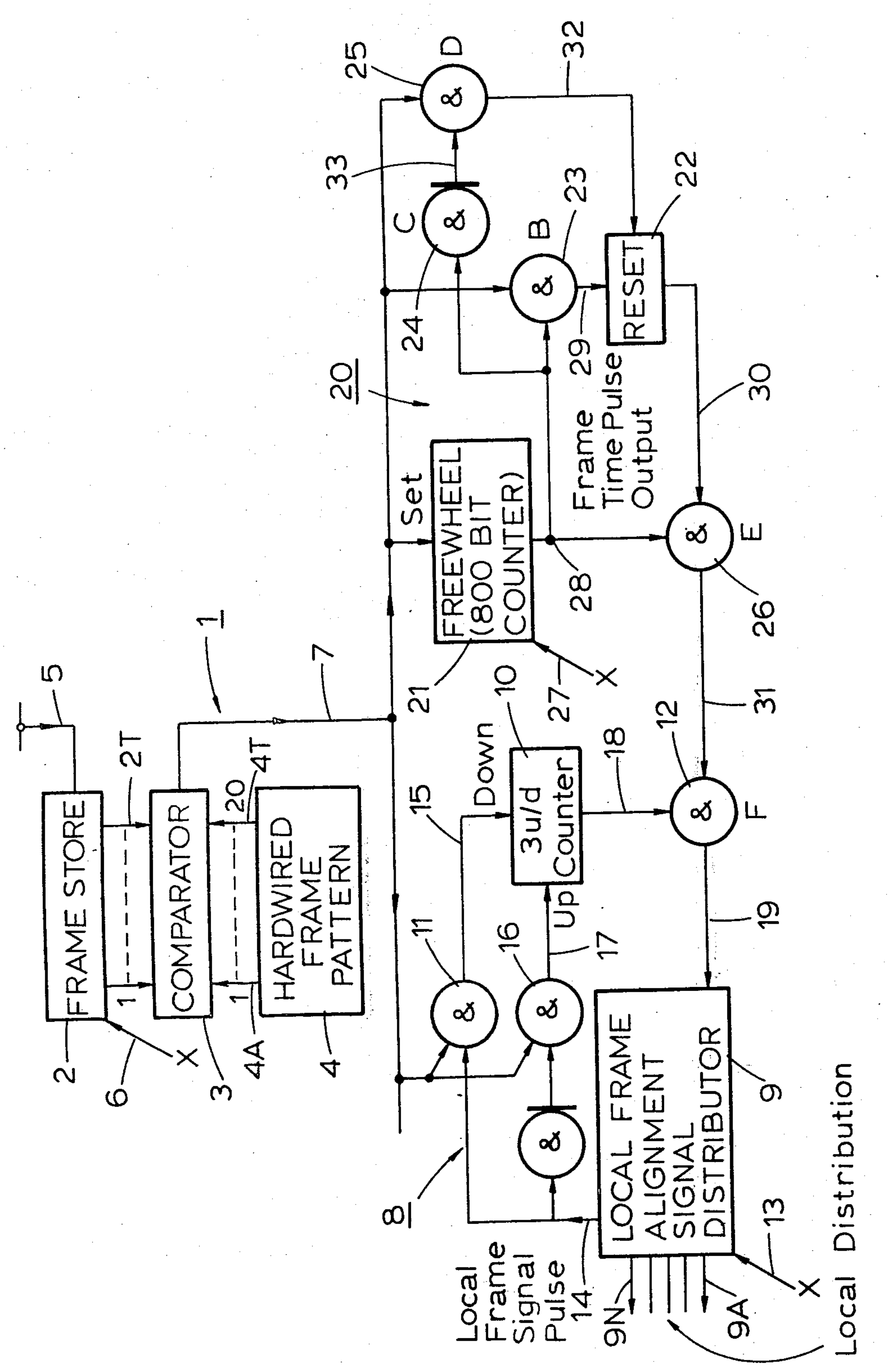
FRAME STORE
COMPARATOR
HARDWIRED FRAME PATTERN
FREEWHEEL (800 BIT COUNTER)
Set
RESET
Frame Time Pulse Output
3u/d Counter
Down
Up
LOCAL FRAME ALIGNMENT SIGNAL DISTRIBUTOR
Local Frame Signal Pulse
Local Distribution
A
B
C
D
E
F
X

TELECOMMUNICATIONS RECEIVERS

This invention relates to telecommunications and in particular to the reception of a telecommunication signal having a frame structure. Such a signal includes information which enables a receiver to determine where a frame begins e.g. by including a characteristic pattern or frame signal in a predetermined position within a frame. Failure to detect the frame signal or its detection in a position other than the predetermined position in the frame is an indication that the frame structure assumed by the receiver is out of alignment or out of synchronism with the true frame structure of the signal. But the indication is not conclusive; it may be due to transmission error or imitation of the frame signal by message information. Accordingly it is known in the art to determine that a misframe condition really exists by a criterion such as a requirement for three successive indications of a misframe condition. Once a misframe condition has been positively identified it is also known from prior art to initiate a search for the correct frame structure, normally by selecting that frame structure in which an observed frame signal would be in the predetermined position. The receiver then shifts the local frame structure to the new one thus found.

The whole process described above is referred to briefly in this Specification as reframing and as outlined above it comprises steps of checking, hunting and shifting. It is an object of the present invention to provide a method of reframing which involves less loss of transmitted information than comparable prior art methods.

In a method of reframing in accordance with the present invention the step of hunting overlaps the step of checking.

In accordance with the present invention apparatus for reframing a frame-structured communication signal comprises frame signal detection means operable to detect indications of a misframe condition, hunt means operable in response to a misframe indication provisionally to select a frame structure which would annul said misframe condition and evaluation and control means operable to accumulate misframe indications and to determine in accordance with first predetermined criteria whether a misframe condition exists and further operable to put into effect the frame structure selected by the hunt means on determining that a misframe condition exists.

In apparatus in accordance with the invention as specified above the hunt means preferably includes confirmation means operable to accumulate indications that the new frame structure provisionally selected is the correct frame structure and to determine in accordance with second predetermined criteria whether said new frame structure is correct.

In order that the invention may be better understood and the method by which it is to be put into effect a specific embodiment will now be described by way of example only with reference to the accompanying drawing in which:

The FIGURE shows in diagrammatic form reframing apparatus according to the invention.

Referring now to the drawing a frame signal detector indicated generally at 1 comprises a frame store 2, a comparator 3 and a frame pattern store 4. The frame signal detector 1 receives a frame-structured telecommunication signal on input line 5. For purposes of illustration this signal is assumed to be a serial binary stream at a bit rate of sixty kbit/s and to have an eight hundred bit frame containing a distributed twenty bit frame signal pattern; in the example the twenty bits of the frame signal pattern are spaced at ten bit intervals in the frame. Frame store 2 has a capacity of two hundred bits and may conveniently be a shift register into which the input signal on line 5 is shifted under the control of a sixty kbit/s clock signal X on line 6. The clock signal X may be derived from the received line signal by standard techniques. Comparator 3 receives a first set of twenty inputs on respective lines 2A, 2B, . . . 2T, of which only the first and last are shown for the sake of clarity, from the store 2 at a spacing corresponding to the distributed frame pattern and a second set of twenty inputs on respective lines 4A, 4B, . . . 4T from frame pattern store 4, of which again only the first and the last are shown in the drawing. Store 4 contains the twenty bit frame signal pattern permanently and provides this as a permanent input to comparator 3 on lines 4A - 4T. Comparator 3 provides a logical 1 signal on output line 7 if and only if the pattern in the received frame store 2 is identical to the reference frame signal pattern in store 4 i.e. line 7 carries a frame pulse.

Control and evaluation means indicated generally at 8 comprise a local frame structure signal distributor (LFD) 9 and a bidirectional weighted counter 10 together with associated logical AND-gates 11 and 12. It is assumed for purposes of illustration that the telecommunication signal frame is a multiplex frame and in this case the local frame structure signal distributor (LFD) 9 provides channel pulses on leads 9A to 9N corresponding to the individual multiplexed channels. The LFD 9 may conveniently be realized as a shift register shifted by the sixty kbit/s clock pulse X on line 13, containing one binary 1, the remaining stages being 0s and the stepping of the solitary 1 providing cyclic sequential channel pulses on leads 9A – 9N. The relative position within the shift register of LFD 9 of the 1 bit constitutes the local frame structure which is effective in the receiver of which the reframing apparatus shown in the drawing forms a part. In addition to the distribution outputs on leads 9A – 9N LFD 9 provides a logical 1 output once per frame on lead 14; in normal error-free and imitation-free conditions this latter pulse coincides with the frame pulse on line 7 and since AND-gate 11 receives the signals on leads 7 and 14 as inputs it produces a logical 1 output on lead 15 if and only if these signals coincide. Hence in error-free imitation-free conditions weighted bidirectional counter 10 receives a 1 input on lead 15 once in each frame; detection of a misframe indication in the form of a frame signal pattern other than in the position determined by the local frame structure causes a 1 on lead 7 unaccompanied by a 1 on lead 14 and hence causes a 1 to appear at the output of an AND-gate 16 which receives the signal on lead 7 and the complement of the signal on lead 14 as inputs. The output of AND-gate 16 is fed as an input on lead 17 to counter 10.

Counter 10 has the property that it increases its stored count by three on receipt of a 1 signal on UP lead 17 and reduces its stored count by one on receipt of a 1 signal on DOWN lead 15; the count stored is limited below at zero and above at nine. Counters of this type are described in detail in British Patent Specification Number 1,280,827 published July 5, 1972. A 1 signal appears on output lead 18 of counter 10 if and only if the stored count reaches the upper limit. AND-gate 12 receives the input from lead 18 and provides an output on lead 19 which resets the LFD 9 if and only if it is a 1. While counter 10 is below its upper limit the signal on lead 18 is 0 and hence the signal on lead 19 is also 0 so that LFD 9 runs steadily under control of clock signal X on lead 13.

A hunt circuit indicated generally at 20 comprises a "freewheel" counter 21, a counter 22 and associated logic gates 23, 24, 25 and 26. Freewheel counter 21 is a scale of eight-hundred counter which is caused to count up steadily by the sixty kbit/s clock pulse X on input line 27 and is reset to zero by a 1 appearing on lead 7. Under error-free, imitation-free conditions frame pulses on lead 7 will be separated by an interval corresponding to eight hundred bits so that the resetting of counter 21 by the frame pulse will be purely notional. Detection of an indication of a misframe condition in the form of a frame signal pattern other than in the position determined by the local frame structure causes the counter 21 to be reset to zero so that it then embodies a provisional frame structure corresponding to the detected frame signal as it continues to be counted up by clock signal X. A frame pulse corresponding to the provisional frame structure of hunt circuit 20 is provided on output lead 28 of counter 21 once per provisional frame. AND-gate 23 receives the signals on leads 28 and 7 as inputs and feeds its output on lead 29 to counter 22. The latter is a counter which holds a maximum count of three and is counted up one by the signal on lead 29 indicating coincidence of the provisional frame structure pulse on lead 28 and the detected frame signal pulse on lead 7. Under error-free, imitation-free conditions provisional and detected frame pulses coincide so that counter 22 is at its maximum count which causes a 1 to appear on counter output lead 30. The latter lead provides one input to AND-gate 26 whose other input is from output lead 28. Hence under error-free, imitation-free conditions a 1 appears at the output of gate 26 and hence at an input to AND-gate 12 on lead 31 once for each frame pulse.

The first detection of an out-of-position frame signal resets counter 22 by means of the pulse on lead 7 which passes via AND-gate 25 to reset lead 32. The absence of a pulse on lead 28 due to the provisional frame structure still being the local frame structure produces a 1 at input 33 of AND-gate 25 by means of inverter gate 24. At the same time the provisional frame structure changes to correspond to the newly observed frame signal and if three successive frame signals on lead 7 accord with this provisional structure a 1 on lead 31 will coincide with a 1 on lead 18 to cause a 1 on lead 19 and hence reset the LFD 9 to accord with the provisional frame structure of the hunt circuit 20.

Summarizing the operation of the reframing apparatus, isolated indications of a misframe condition detected by frame signal detector 1 will cause hunt circuit 20 to home in on the provisional frame structure implied by these indications but they will not satisfy the criterion for a true misframe condition set by check circuit 10. If the indications of a misframe condition should be sufficiently persistent to satisfy the criterion of the check circuit 10 then the local frame structure embodied in LFD 9 will be immediately shifted to the provisional frame structure of hunt circuit 20. If the persistence checks carried out in the hunt circuit 20 by counter 22 are not satisfied then even if a misframe condition is confirmed by check circuit 10 LFD 9 is not brought into line with the provisional frame structure of hunt circuit 20.

It will be clear to those skilled in the reframing art that the persistence checks employed in the control and evaluation means 8 and in the hunt circuit 20 can be varied without departing from the spirit and scope of the invention. For example a simple three-in-succession criterion could be employed in the control and evaluation means 8. In certain circumstances the persistence check provided by the counter 22 in the hunt circuit 20 might be dispensed with on grounds of cost but its inclusion clearly gives a more rugged system.

What we claim is:

1. Apparatus for reframing a frame structured communication signal comprising: signal detecting and generating means connected to receive a frame structured communication signal for generating line frame synchronization signals in response to the detection of frame synchronization patterns in said frame structured communication signal;

main local frame structure generating means for generating main local frame timing signals for receiving and decoding said frame structured communication signal;

reserve local frame structure generating means for generating reserve local frame timing signals, said reserve local frame structure generating means being connected to be reset by each occurrence of said line frame synchronization signals;

decision means;

first and second persistence check means respectively coupled to said decision means, said first persistence check means operable in response to persistent non-coincidence of line frame synchronization signals and main local frame timing signals to deliver a first output to said decision means and said second persistence check means operable in response to the persistent coincidence of reserve local frame timing signals and line frame sychronization signals to deliver a second output to said decision means, said decision means being operable in response to receipt of said first and second outputs simultaneously to reset said main local frame structure generating means in alignment with the reserve local frame timing signal.

2. Apparatus as claimed in claim 1 in which said first persistence check means includes a bi-directional counter having lower and upper limits, the stored count being changed in a first sense in response to non-coincidence of a line frame synchronization signal and a main local frame timing signal and being changed in a second sense, opposite to the first sense, in response to coincidence of a line frame synchronization signal and a main local frame timing signal, a said first output being delivered to said decision means when said counter reaches one of said limits in response to said non-coincidences of line frame synchronization signals and main local frame timing signals.

3. Apparatus as claimed in claim 1 in which said second persistence check means comprises a scale-of-three counter which counts one in response to a coincidence of a reserve local frame timing signal and a line frame synchronization signal and is reset by non-coincidence of a reserve local frame timing signal and a line frame synchronization signal, a said second output being delivered to said decision means when said counter reaches a count of three.

4. Apparatus as claimed in claim 2 in which said bidirectional counter has lower and upper limits of 0 and 9 respectively, the stored count being increased by three in response to a non-coincidence of a line frame synchronization signal and a main local frame timing signal and being decreased by one in response to coincidence of a line frame synchronization signal and a main local frame timing signal, a said first output being delivered to said decision means when said counter reaches a count of 9.

5. A method of re-framing a frame structured communication signal comprising the steps of:

generating line frame synchronization signals in response to the detection of a frame synchronization pattern in said frame structured communication signal;

generating main local frame timing signals for receiving and decoding said frame structured communication signal;

generating reserve local frame timing signals, said reserve local frame time signals being reset by each occurrence of said line frame synchronization signals;

resetting said main local frame time signals in alignment with said reserve local frame time signals on detecting the joint occurrence of persistent non-coincidence of said line frame synchronization signals and said main local frame time signals and persistence coincidence of said line frame synchronization signals and said reserve local frame time signals.

6. A method of reframing a frame structured communication signal as claimed in claim 5 in which detection of coincidence of said line frame synchronization signals and said reserve local frame timing signals is performed by detecting three successive coincidences of said line frame synchronization signals and said reserve local frame timing signals.

7. A method of reframing a frame structured communication signal as claimed in claim 5 in which detection of persistent non-coincidence of said line frame synchronization signals and said main local frame timing signals is performed by detecting the occurrence of an accumulated weight of nine in a counter whose stored count is increased by three on occurrence of a non-coincidence of a line frame synchronization signal and a main local frame timing signal and reduced by one on occurrence of a coincidence of a line frame synchronization signal and a main local frame timing signal, the stored count having a lower limit of zero and an upper limit of nine.

* * * * *